W. CABLE.
MACHINE FOR FORMING RUBBER SOLES FOR BOOTS OR SHOES.

No. 303,804. Patented Aug. 19, 1884.

Witnesses:
C. G. Keyes
H. E. Hemick

Inventor:
Wheeler Cable
by A. H. Spencer
his atty

UNITED STATES PATENT OFFICE.

WHEELER CABLE, OF BOSTON, MASSACHUSETTS.

MACHINE FOR FORMING RUBBER SOLES FOR BOOTS OR SHOES.

SPECIFICATION forming part of Letters Patent No. 303,804, dated August 19, 1884.

Application filed February 6, 1880.

*To all whom it may concern:*

Be it known that I, WHEELER CABLE, of Boston, Massachusetts, have invented a new and useful Machine for Forming Stock for Rubber Boot and Shoe Soles; and I hereby declare that the following specification is a full, clear, and exact description of the same, and the accompanying drawings an illustration.

The object of this invention is to produce automatically from a mass of vulcanizable rubber compound a sheet of such compound of suitable thickness for soles, having formed thereon and as an integral part of said sheet a succession of raised tap-soles, which soles and tap-soles may together be cut from said sheet along a line indicated upon the sheet, and then applied in the formation of a rubber boot or shoe.

My invention consists in a pair of geared rollers mounted in a suitable frame, adapted to be driven by power, and provided with means of adjustment toward and from each other, one of said rollers being smooth and perfectly cylindrical, and the other of like character, except that its surface is formed with one or more tap-sole-shaped depressions, the counterpart of and to correspond with the configuration desired in the tap-sole; also, in the further devices recited in the appended claims.

My present invention is referred to in the Letters Patent No. 256,544, granted to me April 18, 1882, for rubber boot or shoe, to which reference may be made, and in which are set forth the advantage of forming the sole and tap integral and the mode of procedure followed in making rubber boots or shoes in which such sole and tap are employed.

The present improvements relate only to the means of producing the plastic sheet having a series of raised tap-soles upon it, and also to the means of indicating without a pattern or gage the proper line on which to cut the soles from the sheet.

Figure 1:
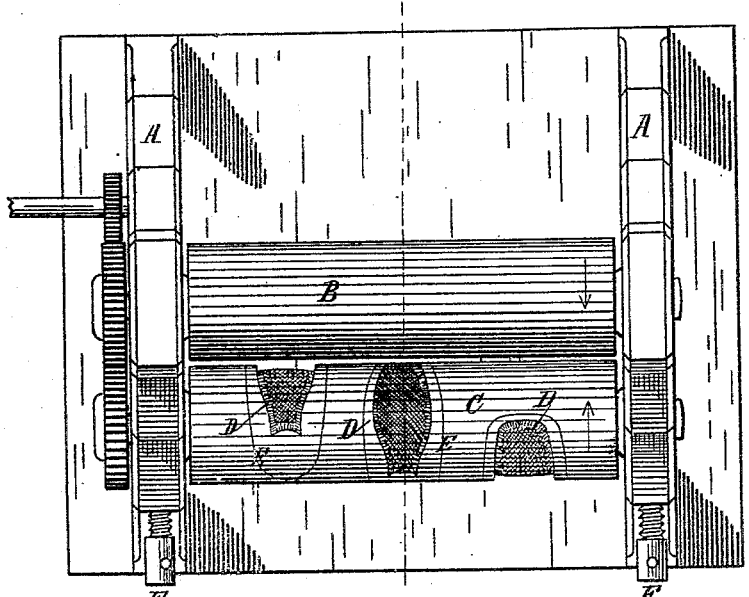
Figure 2:
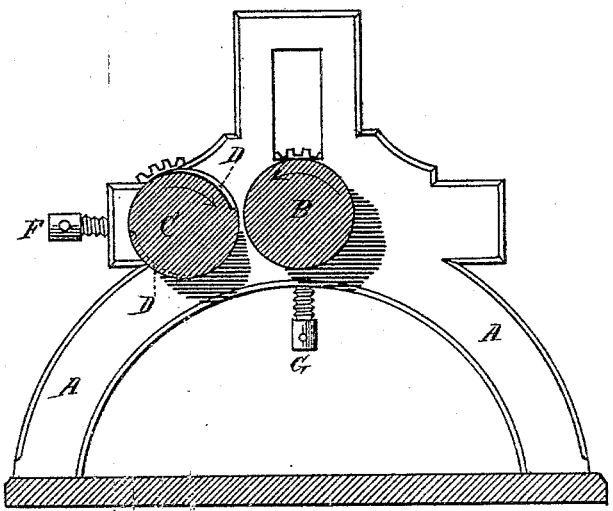

In the drawings, Figure 1 is a plan or top view of the improved machine, and Fig. 2 a transverse vertical central section thereof.

A A are the standards or frame of the machine, united by suitable cross-bars; B, the plain roller, and C the engraved roller lying by its side and almost in contact therewith. The roller C has one or more dies or depressions, D, cut in its face, the exact counterpart, except as hereinafter stated, of the tap-sole which it is desired to form, not only as to outline or configuration, but also as to depth and ornamentation.

E denotes an engraved line inclosing the tap and sole, and indicating on the sheet just where it is to be cut.

Fig. 1 shows the general character of the dies I am accustomed to use, and Fig. 2 indicates the abrupt beginning of the depression at the toe, and its gradually-decreasing depth at the shank part. The reasons for this formation are set forth at length in the specification appertaining to my former patent, and are, in brief, that the boot or shoe is better for the extension and gradual thinning of the tap along the shank, and also that a more perfect finish of the tap is secured by gradually merging its rear part in the sole proper.

F and G represent adjusting-screws, by which the position of the bearings of the rollers is determined or changed from time to time, according to the thickness of sheet or sole desired.

In using my machine the batch of vulcanizable rubber compound is placed on top of the rollers, which, turning toward each other, seize the compound and carry through the narrow space between the rollers as much as can pass, producing a continuous sheet, smooth on one side, and having on the other a series of tap-sole shaped protuberances occurring in regular succession. The plastic sheet may be received on an endless carrying-apron and conveyed to the cutting-room; but I find it more convenient for a workman to sit by the machine, and, without stopping it, cut the sheet into suitable lengths with a knife bearing against a third roller of wood. The lengths cut are placed on trays with the tap-soles up, and removed to the cutting-room, where the workmen with sharp knives cut along the lines E, thus removing the combined sole and tap, to be applied together to the bottoms of rubber boots or shoes in process of manufacture and ready to be subsequently vulcanized. The remainder of the sheet not thus used is returned with new compound to the machine and similarly treated.

The dies D for the tap-sole being formed in the cylindrical surface of the roller C, it will be found in practice that when the plastic sheet is laid flat for application to a boot the rubber will shrink about one-eighth of its length, and in so doing will widen nearly a sixteenth, as compared with the dies. Allowance must therefore be made in cutting the dies, which should be made about one-eighth longer than the tap desired, and nearly one sixteenth narrower.

I am aware of the patent to Hyatt and Meyer, January 17, 1854, showing a machine having a plain and an engraved roller, and adapted to produce a continuous sheet of sole stuff thick enough on one edge for heels, on the other edge for tap-soles, and between its edges for shanks. From such stock of varying thickness soles and heels were to be cut crosswise by a knife or die; but no sole-shaped depression was formed in the roller.

I am also aware that the uppers of light rubber shoes have long been formed and ornamented by means of plain and engraved rollers. I make no claim, however, to any mechanism destitute of sole-shaped depressions, and adapted to form on a sheet of stock a series of raised soles or taps, as set forth.

I claim as of my invention—

1. The mechanism herein described for forming stock for rubber boot and shoe soles, consisting, essentially, of a pair of geared cylindrical rollers, one having one or more tap-sole-shaped depressions a little longer and narrower than the tap-sole desired cut in its surface, and decreasing in depth rearwardly for the purpose specified, said rollers being mounted in a suitable frame, and provided with adjustable bearings, substantially as set forth.

2. In a machine substantially as described for rolling-stock for rubber-shoe soles, the combination, with the plain roller B, of the roller C, formed with one or more sole-shaped dies, D, and a guide-line or indicator, E, for the purpose set forth.

WHEELER CABLE.

Witnesses:
 A. H. SPENCER,
 SILAS POOLE.